United States Patent
Jadaud et al.

(10) Patent No.: US 6,693,238 B2
(45) Date of Patent: Feb. 17, 2004

(54) TRUNKING ACCESSORY AND A COMBINATION INCLUDING THE ACCESSORY AND TRUNKING WITH A BASE SECTION SPECIFICALLY ADAPTED TO SUIT THE ACCESSORY

(75) Inventors: Alain Jadaud, Tennie (FR); Bruno Gautier, Sille Le Guillaume (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 10/062,664

(22) Filed: Feb. 5, 2002

(65) Prior Publication Data

US 2002/0125028 A1 Sep. 12, 2002

(30) Foreign Application Priority Data

Feb. 5, 2001 (FR) .............................. 01 01501

(51) Int. Cl.$^7$ ................................. H02G 3/10
(52) U.S. Cl. .................. 174/48; 17/65 R; 17/72 R; 17/72 C; 17/95; 17/100; 17/101
(58) Field of Search ................. 174/48, 65 R, 174/72 R, 72 C, 95, 100, 101

(56) References Cited

U.S. PATENT DOCUMENTS

| | | | | |
|---|---|---|---|---|
| 5,924,729 A | * | 7/1999 | Gleason et al. | 188/371 |
| 5,981,872 A | * | 11/1999 | Decore et al. | 174/101 |
| 5,998,732 A | * | 12/1999 | Caveney et al. | 174/48 |

FOREIGN PATENT DOCUMENTS

| | | | |
|---|---|---|---|
| DE | 78 03 034 | 5/1978 | 174/48 |
| DE | 198 40 832 | 3/1999 | 174/48 |
| WO | WO 98/10499 | 3/1998 | 174/48 |

* cited by examiner

Primary Examiner—Dean A. Reichard
Assistant Examiner—Anton Harris
(74) Attorney, Agent, or Firm—Young & Thompson (57) ABSTRACT

An accessory for trunking includes a body provided at one end at least with attachment arrangements by which it can be attached locally to a longitudinal wall of the base section of the trunking. The attachment arrangements include a lug which can be clipped into a housing in the wall and includes an actuator tongue connected to a free end of the lug. The actuator tongue is accessible from the outside of the base section of the trunking and can be pulled in its longitudinal orientation direction to disengage from the housing the free end of the lug.

17 Claims, 5 Drawing Sheets

TRUNKING ACCESSORY AND A COMBINATION INCLUDING THE ACCESSORY AND TRUNKING WITH A BASE SECTION SPECIFICALLY ADAPTED TO SUIT THE ACCESSORY

BACKGROUND OF THE INVENTION

1. Field of the Invention

The present invention relates to a trunking accessory including a body having at one end or at both ends coupling means for attaching it locally to a longitudinal wall of a base section of the trunking, for example to an internal partition or to a lateral flange of the base section.

Here the term "accessory" refers to any type of accessory or support that can extend from one longitudinal wall of the trunking base section to the other, for example clips or supports for electrical devices. It can also refer to supports for finishing accessories such as joints, corners or branches.

The term "accessory" also refers to an individual accessory, such as a fishplate, which is fixed to the inside of a lateral flange or a partition of the trunking base section to join together juxtaposed base sections and to hold the butt-jointed end in position when fixing the free end.

2. Description of the Prior Art

The documents GB 1 021 871, U.S. Pat. No. 4,602,124, U.S. Pat. No. 4,589,449, DE 34 41 377 and DE 93 17 739.9 disclose accessories installed between lateral flanges of a trunking base section by wedging their two free ends into housings provided for this purpose on said lateral flanges.

To fit this kind of accessory to the trunking base section, and remove it therefrom, it is therefore necessary either to spread apart the lateral flanges of the base section or to flex the accessory, which must therefore be flexible to some degree.

The document FR 2 133 705 discloses a corner accessory which, for fitting it to lateral flanges of the trunking base section, includes clipping tongues having beads which are adapted to be clipped into housings and are accessible from outside the trunking base section by inserting the tip of a tool through windows provided on said accessory.

The document DE 35 34 669 discloses a clip fitted between lateral flanges of a trunking base section by means of hooks provided at each end of said clip and joined to the body of the clip by flexible lugs that are accessible from the outside to release the hooks from housings provided inside rims on the lateral flanges of said base section.

Each flexible lug has a hook at its free end and the hook is disengaged from said housing by applying pressure to said flexible lug, through a window in the body of the clip, to deflect it toward the inside of the trunking base section.

The document WO 98/10499 discloses an accessory in which the means for attaching it to a corresponding longitudinal wall of the trunking base section include a handle and a body adapted to be accommodated in a housing formed by a perpendicular rim of said longitudinal wall and to be immobilized in said housing by a shoulder bearing against a complementary shoulder. The handle has a textured or toothed surface to which pressure can be applied with a finger to flex it to disengage the shoulder from the complementary shoulder.

In the light of the aforementioned prior art, the present invention proposes a new trunking accessory having a new arrangement of attachment means enabling the accessory to be fitted to and removed from any type of trunking base section simply and quickly and without having to spread apart the lateral flanges or the partitions between which it is fitted.

SUMMARY OF THE INVENTION

To be more specific, the present invention proposes an accessory for trunking, including a body provided, at one or both of its ends, with attachment means for attaching it locally to a longitudinal wall of the base section of the trunking, for example an internal partition or a lateral flange of the base section, wherein the attachment means include a lug adapted to be clipped into a recess, also referred to as housing in the wall and including a pull tongue, also referred to as an actuator tongue, connected to an engagement end, also referred to as a free end of the lug, the pull tongue being accessible from outside the base section of the trunking and adapted to be pulled in its longitudinal orientation direction to withdraw from the recess the engagement end of the lug.

Other non-limiting and advantageous features of the accessory according to the invention are as follows:

said lug is connected to said end of the accessory by a flexible connection;

said flexible connection is a connection forming a pivot hinge of said lug;

said flexible connection forms a boss adapted to bear against an inside face of said recess or housing in said wall to clip said lug into said recess or housing and immobilize it there;

the accessory includes an opening in said lug and in a portion of said body near said lug, through which said pull tongue or actuator tongue is accessible;

said pull tongue or actuator tongue includes holding means;

said holding means include at least one opening for inserting the tip of a tool;

said holding means include a rib which can be depressed with the tip of a tool;

said holding means include a rim which can be gripped manually;

said lug has on each of its lateral sides a rim which can be depressed with a finger to clip said lug in said recess or housing in said wall;

in a rest position, said lug is oblique to said body and said pull tongue or actuator tongue is substantially parallel to said body and at an acute angle to said lug;

said lug is in one piece with the accessory;

the body is globally transverse to the longitudinal axis of the base section of the trunking;

the body extends between two longitudinal walls of the base section of the trunking and it has at its other end a tab adapted to engage behind the rim of one of the two longitudinal walls; and the body extends between two longitudinal walls of the base section of the trunking and it has at its other end said lug with its pull tongue or actuator tongue.

The invention also proposes a combination including a base section of trunking and an accessory as specified above and adapted to be attached locally to a longitudinal wall of said base section, said wall including to this end a recess or housing defined between, on the one hand, a longitudinal rib on an inside face of said wall and, on the other hand, the perpendicular inside surface of a perpendicular rim of said wall.

The following description, which is given with reference to the accompanying drawings, which are provided by way of non-limiting example, explains clearly in what the invention consists and how it can be put into effect.

DETAILED DESCRIPTION OF THE PREFERRED EMBODIMENTS

Figures 1, 2:
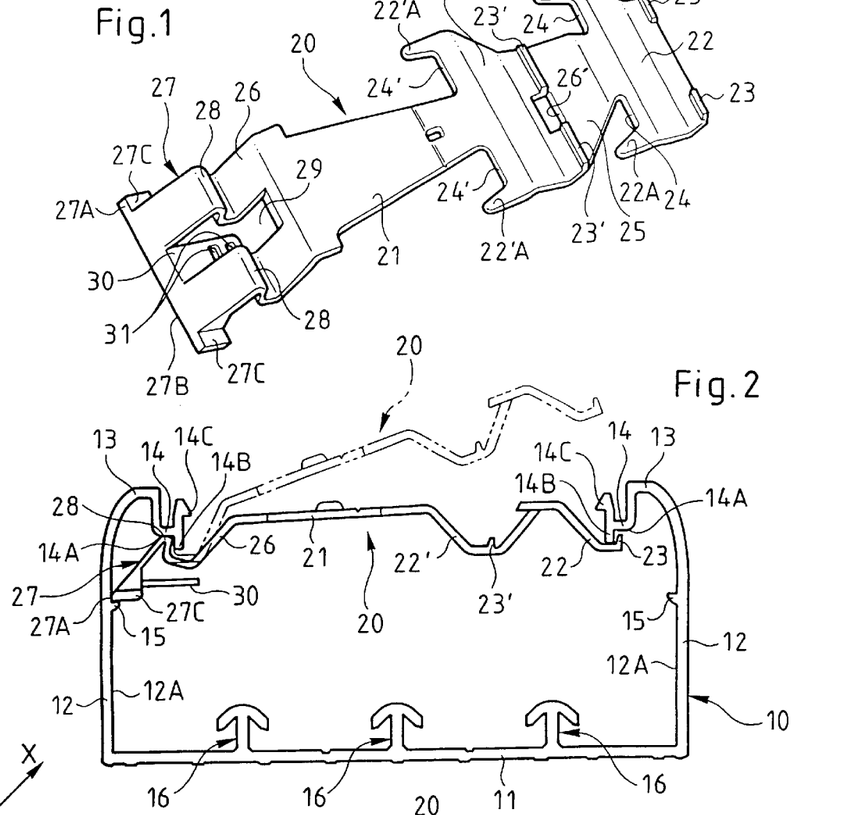
FIG. 1 is a perspective view of one embodiment of an accessory according to the invention.
FIG. 2 is an end view of a trunking base section in which the accessory shown in FIG. 1 is mounted, constituting therewith a combination according to the invention.

FIG. 1 shows a trunking accessory 20, here a retaining clip, which includes a body 21 provided at its two ends 26, 22 with different attachment means for locally attaching it between two longitudinal walls 12 of a base section of trunking 10 (see FIGS. 2, 3, 4 and 5), for example internal partitions 40 and/or lateral flanges 12.

Figure 3:
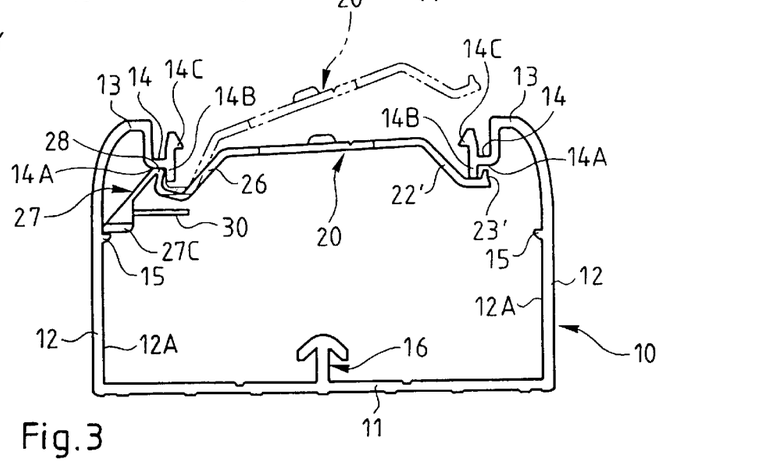
FIG. 3 is an end view of another trunking base section in which a variant of the accessory shown in FIG. 1 is mounted, constituting therewith a combination according to the invention.

As shown in FIGS. 2 and 3, the base section of the trunking 10 includes a back 11 and two lateral flanges 12 each having at a free edge 13 a perpendicular rim 14 forming a groove for fitting means for mounting a closing cover section (not shown). All this is known in the art. A hook 14C is provided on the outside of the perpendicular rim 14 on each lateral flange 12 for attaching a clipping tooth of a closure cover section (not shown).

The body 21 of the retaining clip 20 is generally trapezoidal in shape with a first mounting end 22 that is also trapezoidal in shape, but wider, the mounting end 22 having on one edge tabs 23 for fastening said end 22 behind a perpendicular rim 14 of a lateral flange 12 of the base section of the trunking 10 (see FIG. 2) or behind a perpendicular rim of an internal partition carried by said base section. All this is also known in the art.

The mounting end 22 has, opposite the tabs 23, two lateral hooks 24 defined between the oblique edges of an end portion 25 of the body 21 of the retaining clip 20 and legs 22A carried by said mounting end 22.

The lateral hooks 24 advantageously enable at least one electrical cable (not shown) to be removably coupled to said retaining clip 20 in the absence of the closing cover section of the trunking 10.

This particular configuration of the retaining clip 20 is not described in detail here because it is the subject matter of French patent application FR 97 11059, which may be referred to for more details.

In the embodiment shown in FIG. 1, the retaining clip 20 includes, between the body 21 and the trapezoidal shape end portion 25, a second mounting end 22' identical to the mounting end 22, with two tabs 23' for attaching it behind a perpendicular rim of a lateral flange 12 or an internal partition of the base section of trunking 10 (see FIG. 3) and two lateral hooks 24' defined between legs 22'A carried by said mounting end 22' and the oblique edges of the body 21.

There is a line of weakness 26' at the junction between said mounting end 22' and the end portion 25 of the body 21, so that the first mounting end 22 can be removed if necessary, thereby reducing the length of the retaining clip 20 to fit it to a narrower trunking base section (see FIG. 3).

Figure 4:
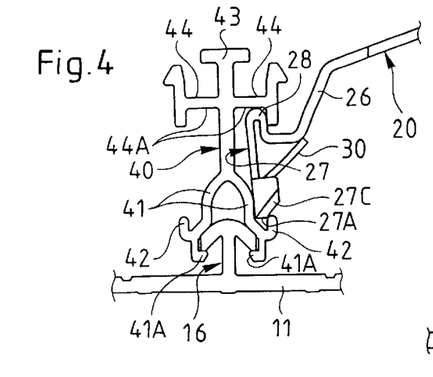
FIG. 4 is an end view of a partition mounted on a trunking base section on which are mounted means for attaching an accessory according to the invention.
Figure 5:
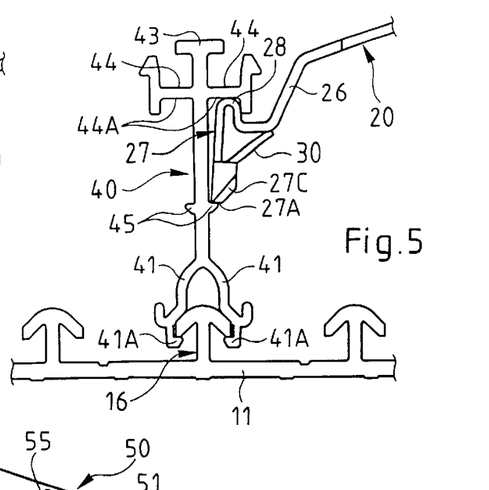
FIG. 5 is a view similar to that of FIG. 4 with a taller partition.

At its other end 26 the body 21 of the retaining clip 20 shown in FIG. 1 has attachment means that constitute the subject matter of the present invention, for attaching it locally to a longitudinal wall of the base section of the trunking 10, such as a lateral flange 12 of the base section (see FIGS. 2 and 3) or an internal partition 40 mounted on longitudinal ribs 16 on the back 11 of the base section (see FIGS. 4 and 5).

The attachment means advantageously include a lug 27 adapted to be clipped into a recess or housing in the lateral flange 12 or the internal partition 40. The lug 27 is generally oblique to the principal direction of the body 21 of the retaining clip 20. The lug 27 has a pull tongue or actuator tongue 30 extending at an acute angle from the engagement or free end 27A of said lug 27.

Said actuator tongue 30 lies behind the inside face of the body 21 of the retaining clip 20 which in use faces the inside of the base section of the trunking 10.

When the retaining clip 20 is in a rest position, as shown in FIG. 1, i.e. when it is not mounted in the trunking base section, the actuator tongue 30 is substantially parallel to the general direction of the body 21 of said retaining clip 20.

As shown in FIG. 1 in particular, there is an opening 29 in a central portion of the lug 27 and in a portion of the body 21 of the retaining clip 20 situated near said lug, i.e. the end part 26 of the body 21 of the retaining clip 20, to which said lug 27 is connected. The opening 29 provides access to said actuator tongue 30 when the retaining clip 20 is mounted in the trunking base section, more specifically when said lug is clipped into the corresponding housing in the corresponding longitudinal wall of the trunking base section.

The pull tongue or actuator tongue 30, which is accessible from outside the base section of the trunking 10 when the retaining clip 20 is mounted in said base section, can then be pulled in its longitudinal orientation direction (here parallel to the back 11 of the base section of the trunking 10) to withdraw from the recess or housing the engagement or free end 27A of the lug 27 clipped into said housing.

The lug 27 is advantageously joined to the end 26 of the body 21 of the retaining clip 20 by a flexible connection 28 forming a hinge on which said lug 27 pivots.

As described in more detail later, if traction is applied to the actuator tongue 30 in its longitudinal orientation direction, the lug 27 pivots about the axis of the pivot hinge 28, causing the free end 27A of said lug 27 to move along a circular arc.

The flexible connection 28 between the lug 27 and the end 26 of the body 21 of the retaining clip 20 advantageously forms a boss adapted to bear against an inside face 14A, 44A of the housing in the longitudinal wall 12, 40 to clip said lug 27 in said housing and immobilize it there.

The two base sections of the trunking 10 shown in FIGS. 2 and 3 are specifically adapted for mounting the retaining clip 20 according to the invention shown in FIG. 1. Each base section of the trunking 10 then forms with the retaining clip 20 a combination according to the invention.

In particular, each lateral flange 12 of the base section of the trunking 10 shown in FIGS. 2 and 3 includes a housing for mounting the lug 27 carried by the end 26 of the body 21 of the retaining clip 20, which is defined between, on the one hand, a longitudinal rib 15 on the inside face 12A of each of the lateral flanges 12 and, on the other hand, the perpendicular inside surface 14A of the perpendicular rim 14 on each of said lateral flanges 12.

The perpendicular inside surface 14A is formed by the back of the groove adapted to accommodate one end of a closure cover section (not shown) and by the inside surface of a lip 14B carried by said rim and extending the hook 14C.

The distance between each longitudinal rib 15 and each perpendicular inside surface 14A matches the length of the lug 27 carried by the retaining clip 20.

Accordingly, when the lug 27 is fitted into said housing defined between the longitudinal rib 15 and the corresponding perpendicular inside surface 14A of the lateral flange 12 to which the retaining clip 20 is attached, the boss formed by the pivot hinge 28 of the lug 27 is immobilized through bearing against the perpendicular inside surface 14A and the free end 27A of said lug 27 bears on the longitudinal rib 15 with its end edge 27B pressed against the inside face 12A of said lateral flange 12.

In a position shown in chain-dotted outline in FIG. 2 the retaining clip 20 is attached in this way to the lateral flange 12 of the trunking base section in a standby position oblique to the longitudinal axis X of the base section of the trunking 10.

To move it to its final position in the base section of the trunking 10, the retaining clip 20 is pivoted about the axis of the pivot hinge 28 from its oblique ready position shown in chain-dotted outline in FIG. 2 to its final position shown in continuous outline, so that the tabs 23 on the mounting end 22 engage behind the perpendicular rim 14, to be more specific behind the lip 14B carried by said perpendicular rim of the other lateral flange 12 of the base section of the trunking 10.

When the retaining clip 20 is in its final position in the base section of the trunking 10, the actuator tongue 30 of the lug 27 is behind the body 21 of said clip (i.e. between the body 21 and the back 11 of the base section) and therefore does not take up any room on the front side of said base section.

FIG. 2 shows a wide trunking base section and in this figure the tabs 23 at the mounting end 22 of the retaining clip 20 engage behind the lip 14B of the corresponding lateral flange 12 of the trunking base section.

In contrast, FIG. 3 shows a narrower base section and in this figure the retaining clip 20 is made shorter by breaking off the mounting end 22 to match the narrower width. Accordingly it is the mounting end 22' of the retaining clip that engages with the corresponding lateral flange 12 of the trunking and its tabs 23' that engage behind the lip 14B of the corresponding perpendicular rim 14 of the lateral flange 12 of said base section of the trunking 10.

In the mounting position shown in FIG. 2 or FIG. 3 the retaining clip 20 extends from one lateral flange 12 of the trunking base section to the other in the direction Y transverse to the longitudinal axis X of the trunking base section and the actuator tongue 30 of the lug 27 of said retaining clip 20 is parallel to the body 21 of said retaining clip 20.

Returning to the subject of the actuator tongue 30 connected to the free end 27A of the lug 27, it advantageously includes holding means so that it can be pulled easily through the opening 29 in order to withdraw from the housing the free end 27A of the lug 27, i.e. to withdraw from the longitudinal rim 15 the free end 27A that bears against it, in order to withdraw the retaining clip 20 from the base section of the trunking 10.

In the embodiment shown in FIG. 1 the holding means include two openings 31 into which the tip of a tool can be inserted.

Nevertheless, in other embodiments, not shown, the holding means provided on said actuator tongue 30 can include at least one rib which can be depressed by the tip of a tool or a rim which can be gripped manually through the opening 29.

Thus, to withdraw the lug 27 from its housing on the lateral flange 12, it suffices to insert the tip of a tool into one of the openings 31 in the actuator tongue accessible through the opening 29 and to use the hook 14C of the perpendicular rim 14 on that lateral flange 12 as a fulcrum for the tool, which is used as a lever, and thereby to apply a traction force to the actuator tongue 30 in the longitudinal orientation direction of said tongue along the axis Y toward the inside of the trunking base section. The free end 27A of the lug 27 joined to said actuator tongue 30 then follows the movement of the latter and is withdrawn from the longitudinal rim 15. This movement in translation of the free end 27A is made possible because, due to the action of the actuator tongue 30, said lug 27 pivots about the axis of the pivot hinge 28, bending toward the outside 26 of the body 21 of the retaining clip 20.

The lug 27 of the retaining clip 20 advantageously has a rim 27C on each lateral edge which can be depressed with a finger. The lateral rims 27C assist with clipping said lug 27 into the housing defined between the longitudinal rib 15 and the perpendicular inside surface 14A of the lateral flange 12 of the base section of the trunking 10.

To be more specific, to fit the lug 27 of the retaining clip 20 into the housing in the lateral flange 12, the boss formed by the pivot hinge 28 of said lug is positioned behind the perpendicular rim 14 and the free end 27A of said lug is positioned behind said longitudinal rib 15. The lateral rims 27C of said lug 27 are then depressed with the fingers to cause it to tilt so that its free end 27A is moved to a position over said longitudinal rib 15 so that it rests on the latter. In this position, the boss formed by the pivot hinge 28 bears against said perpendicular inside surface 14A.

FIGS. 4 and 5 show the mounting of the lug 27 carried by the end 26 of the retaining clip 20 or any equivalent accessory on two internal partitions 40 of the same type but of different heights and each mounted on a longitudinal rib 16 on the back 11 of the base section of the trunking 10.

Each internal partition 40 has on its T-shaped outer edge 43 perpendicular rims 44 for mounting closing cover sections (not shown). Each partition has on its inside edge branches 41 with teeth 41A for clipping it onto the longitudinal rib 16.

The internal partition 40 shown in FIG. 4 has on each face a housing adapted to accommodate the lug 27 on the end 26 of the body 21 of the retaining clip 20. The housing is defined between, on the one hand, a perpendicular inside surface 44A of a perpendicular rim 44 of the internal partition 40 and, on the other hand, a hook 42 at the end of a branch 41 for mounting it on said longitudinal rib 16 and oriented in the opposite direction to the tooth 41A on said branch 41.

Accordingly, as shown in FIG. 4, when the lug 27 is clipped into the housing previously defined it is substantially perpendicular to the body 21 of the retaining clip 20 and its actuator tongue 30 is therefore directed toward said end 26 of said body 21 of the retaining clip 20.

To unclip the lug 27 from the housing formed on said internal partition 40, it is again sufficient to pull on the actuator tongue 30 in the longitudinal direction to cause the lug 27 to pivot about the axis of the pivot hinge 28 and thereby withdraw the free end 27A of said lug 27 from its bearing engagement against the hook 42.

In FIG. 5, the housing of the internal partition 40 adapted to accommodate the lug 27 of the retaining clip 20 is similar to that provided on each lateral flange 12 of the base section of the trunking 10 shown in FIG. 2, since it is defined between a longitudinal rib 45 on one face of the internal partition 40 and the perpendicular inside face 44A of the perpendicular rim 44 on that face.

The orientation of the actuator tongue 30 shown in FIG. 5 is identical to that shown in FIG. 4.

Figure 6:
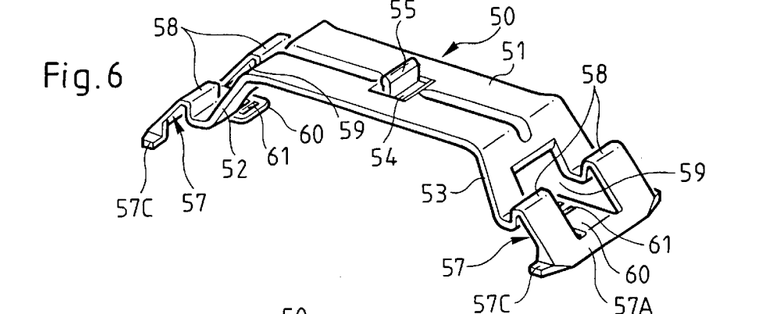
FIG. 6 is a three-quarter perspective view of another embodiment of an accessory according to the invention.
Figure 10:
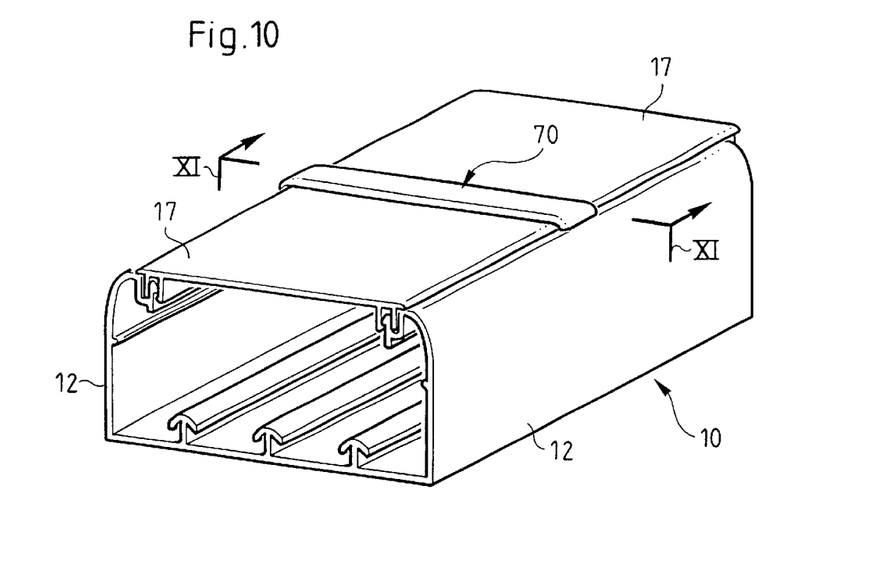

FIG. 6 shows another accessory 50 according to the invention in the form of a joint support of a device for butt-jointing lengths of cover section 17 (see FIG. 10).

Figure 11:
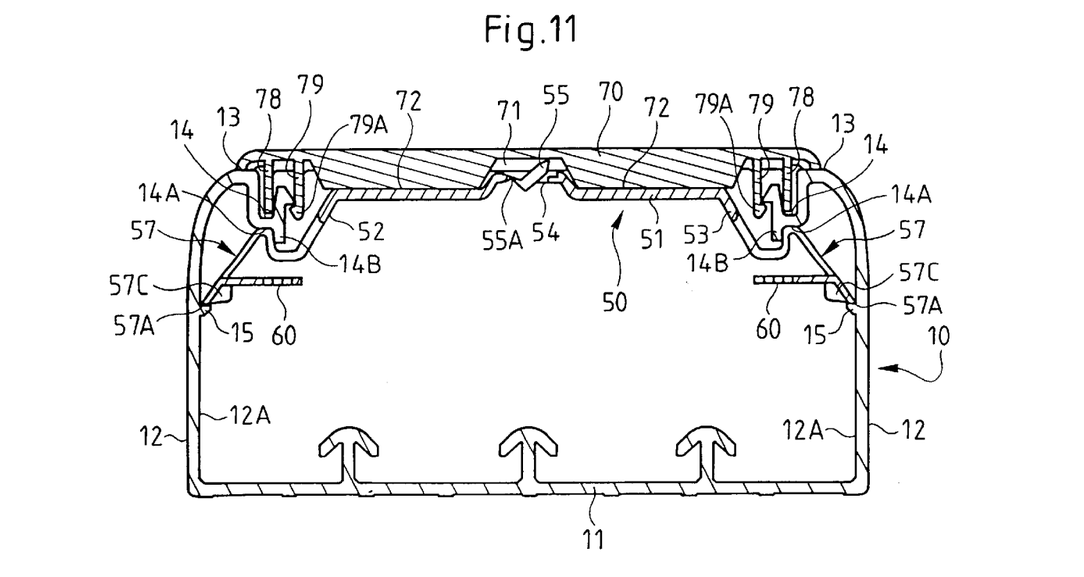
FIG. 11 is a view in section taken along the line XI—XI in FIG. 10.

The accessory 50 includes a body 51 having a window 54 in its middle part through which emerges a finger 55 forming an abutment for the end edges of the lengths of cover section 17 to be jointed. The finger 55 can advantageously pivot in the window 54 so that it can retract when a joint cover 70 is attached to the accessory 50, as shown in FIGS. 10 and 11 in particular. The retractable finger 55 does not of itself constitute part of the present invention and is therefore not described here in detail.

Figure 7:
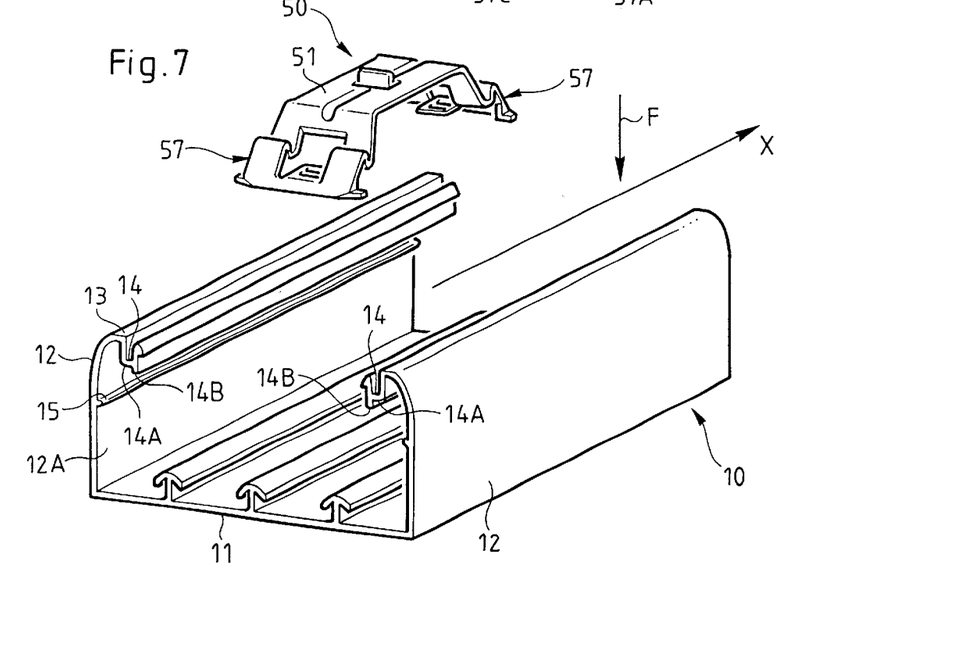
FIGS. 7 to 10 show the steps of fitting the accessory shown in FIG. 6 to a trunking base section, constituting therewith a combination according to the invention.

As shown in FIG. 6 in particular, coupling means are provided at each end of the body 51 for mounting the joint support 50 on the base section of the trunking 10 shown in FIG. 7. The attachment means are similar to the attachment means on the end 26 of the body 21 of the retaining clip 20 shown in FIG. 1.

To be more specific, at each end 52, 53 of the body 51 of the accessory 50 is a lug 57 adapted to be clipped into a housing in a longitudinal wall of the trunking base section, here a lateral flange 12 of the base section of the trunking 10 shown in FIG. 7.

Each lug 57 is connected to the corresponding end 52, 53 of the body 51 of the accessory 50 by a flexible connection 58 forming a pivot hinge and a boss adapted to bear on an inside surface of the housing, i.e. on the perpendicular inside surface 14A of the perpendicular rim 14 of the corresponding lateral flange 12 of the base section of the trunking 10.

The base section 10 is identical or similar to the base sections shown in FIGS. 2 and 3, and the pertinent passages of the description of FIGS. 2 and 3 should be referred to for more details of the housings provided on the lateral flanges 12 of the trunking base section to accommodate the lugs 57 on the accessory 50.

Each lug 57 has rims 57C on its lateral sides which can be depressed with a finger to clip said lug 57 in the corresponding housing on the lateral flange 12 of the base section of the trunking 10.

As before, there is an opening 59 in each lug 57 and in each end 52, 53 of the body 51 of the trunking to provide access to the actuator tongue 60 connected to each free end 57A of each of the lugs 57 and lying behind the inside face of the body 51 of said joint support 50 when the joint support 50 is mounted between the lateral flanges 12 of the base section of the trunking 10.

The actuator tongue 60 is also used to withdraw the free end 57A of the lug 57 from the corresponding housing. To this end it can be pulled in its generally longitudinal orientation direction to withdraw the free end 57A from its bearing engagement against the longitudinal rib 15.

When the accessory is in its rest configuration, each actuator tongue 60 is globally parallel to the inside face of the body 51 of said accessory (i.e. the face that in use faces toward the back of the base section) and at an acute angle to the corresponding lug 57, which is oblique to the body 51. Each actuator tongue 60 has holding means of the same kind as those described for the actuator tongue 30. Here the holding means include two openings 61 for inserting the tip of a tool.

Of course, other holding means can also be provided, such as ribs that can be depressed by the tip of a tool or a rim that can be gripped manually.

Fitting the joint device and in particular the joint support 50 between the lateral flanges 12 of the base section of the trunking 10 is described next with reference to FIGS. 7 to 10.

The joint support 50 is oriented along the longitudinal axis X of the trunking 10 moved in the direction of the arrow F into the base section of the trunking 10, as shown in FIG. 7.

The joint support 50 is then turned to position it transversely to the longitudinal axis X. The installer then engages each of the lugs 57 on the joint support 50 in the corresponding housing in the lateral flange 12 of the base section of the trunking 10 by depressing the rims 57C.

It will be noted that each lug 57 with its actuator tongue 60 associated with the joint support 50 is mounted on and demounted from each lateral flange 12 in exactly the same manner as the lug 27 on the retaining clip 20.

Figure 8:
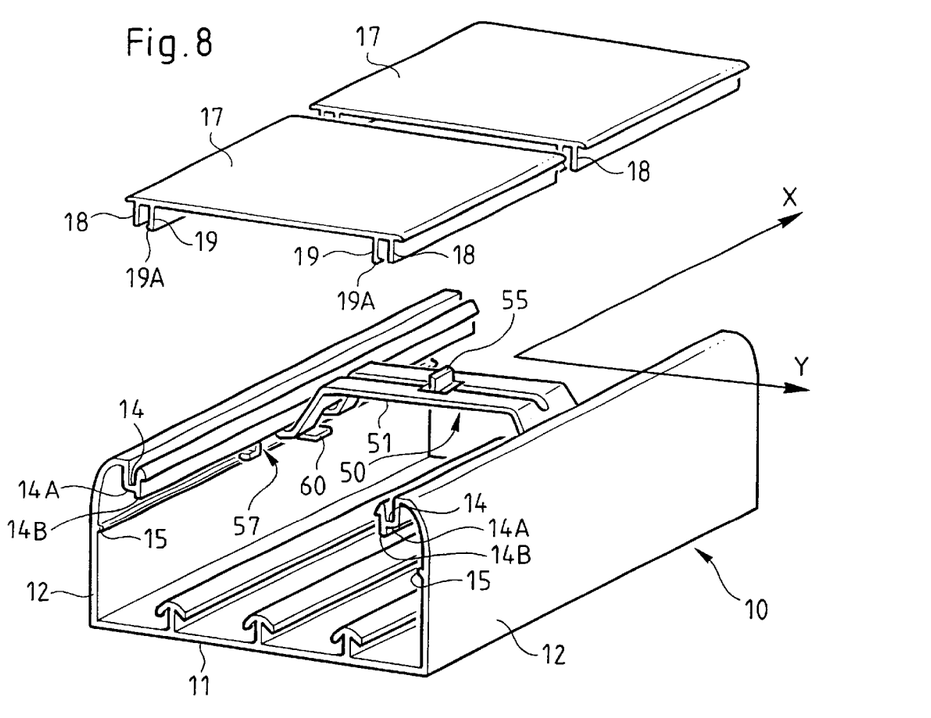

As shown in FIG. 8, when the joint support 50 has been mounted between the two lateral flanges 12 of the base section of the trunking 10, the actuator tongues 60 are accessible from outside the base section of the trunking 10 via openings 59 provided at each end of the body 51.

Figure 9:
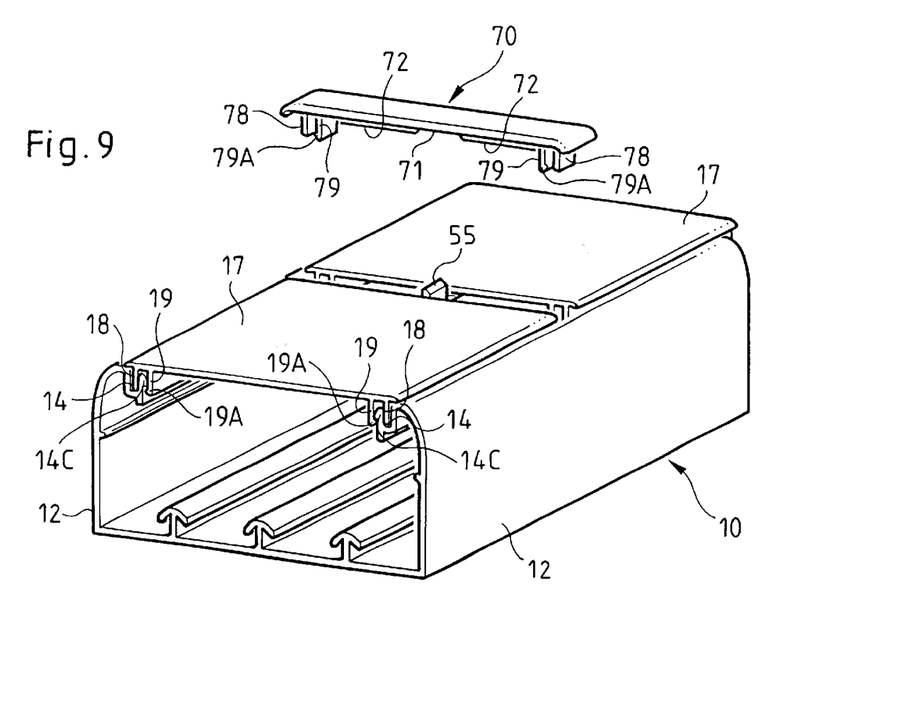

The lengths of cover section 17 are then attached to the base section of the trunking 10 so that a cut end edge of each length abuts against the finger 55 that emerges at the level of the outside surfaces of the lengths of cover section (see FIG. 9).

Each length of cover section 17 is conventionally clipped into a perpendicular rim 14 of a lateral flange 12 of the base section of the trunking 10. To this end, each length 17 has near each longitudinal end edge a first tongue 18 adapted to engage in the groove formed by the corresponding perpendicular rim 14 and a second tongue 19 having at its free end a tongue 19A adapted to hook clip into a corresponding hook on the perpendicular rim 14.

As shown in FIGS. 9, 10 and 11 in particular, a joint cover 70 is then attached which has on its inside face a central housing 71 adapted to accommodate the finger 55 and, on respective opposite sides of the central housing 71, ribs 72 adapted to bear against the body 51 of the joint support 50. When fitting the joint cover 70 by clipping it into the perpendicular rims 14 of the lateral flanges 12 of the base section of the trunking 10, the back of the central housing 71 of the joint cover 70 presses on the finger 55 to retract it slightly in the window 54. This retraction is obtained by the finger 55 pivoting about the hinge 55A that connects it to the body 51 of the joint support 50.

The joint cover 70 is mounted on the perpendicular rims 14 of the lateral flanges 12 of the trunking base section by means of longitudinal lugs 78 and longitudinal lugs 79 provided with clipping teeth 79A at their free end (see FIG. 11).

When the joint cover 70 is mounted, its ribs 72 bear against the body 51 of the joint support 50 and an end portion of each length of cover section 17 is sandwiched between the inside face of the joint cover 70 and the outside face of the body 51 of the joint support 50.

Figure 12:
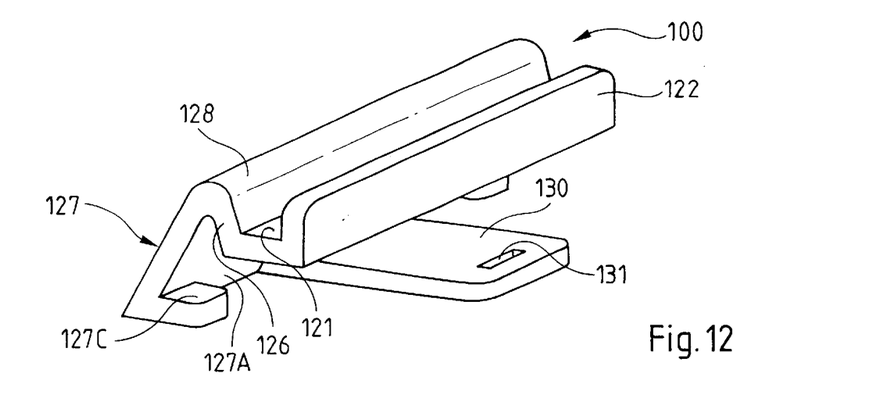
FIG. 12 is a three-quarter perspective view of another embodiment of an accessory according to the invention.
Figure 14:
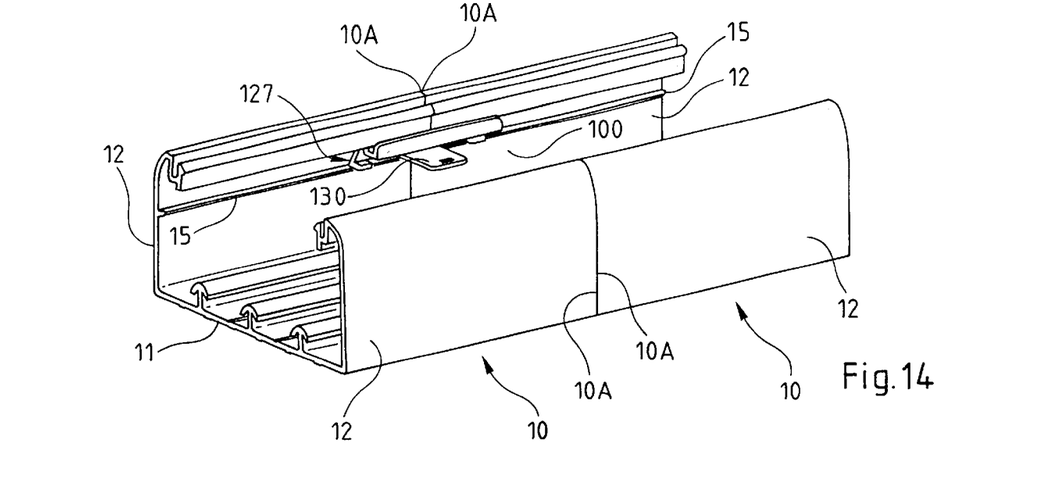
FIG. 14 is a perspective view of two juxtaposed trunking base sections with the accessory shown in FIG. 12 mounted at the junction between them.

FIG. 12 shows another accessory 100 according to the invention in the form of a fishplate for joining base sections of juxtaposed lengths of trunking 10 (see FIG. 14).

The accessory 100 has a body 121 with one end 126 including attachment means for mounting the fishplate 100 on the base sections of the juxtaposed lengths of trunking 10, at the junction of the end edges 10A of said trunking base sections (see FIG. 14). The attachment means are similar to the attachment means on the end 26 of the body 21 of the retaining clip 20 shown in FIG. 1.

Figure 13:
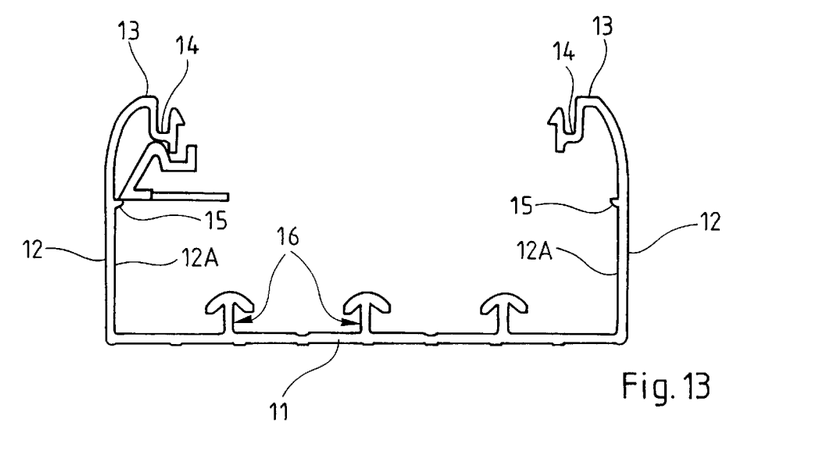
FIG. 13 is an end view of two juxtaposed trunking base sections with the accessory shown in FIG. 12 mounted at the junction between them.

To be more specific, the attachment means include a lug 127 adapted to clip into a housing formed by abutting two housings provided in the juxtaposed lateral flanges of the base sections of the trunking 10 (see FIGS. 13 and 14). The lug 127 is connected to the end 126 of the body 121 of the accessory 100 by a flexible connection 128 forming a pivot hinge and a boss adapted to bear on an inside face of the housing, i.e. on the perpendicular inside surface of the juxtaposed perpendicular rims 14 of the corresponding lateral flanges 12 of the base sections of the juxtaposed lengths of trunking 10.

Here the base sections of the trunking 10 are identical or similar to the base sections shown in FIGS. 2, 3 and 7, and the pertinent passages of the description of FIGS. 2 and 3 should be referred to for details of the housings provided on the lateral flanges 12 of each of the base sections of the trunking adapted to accommodate the lug 127 of the accessory 100.

The lug 127 also has rims 127C on its lateral sides which can be depressed with a finger to clip said lug 127 into the corresponding housing in the juxtaposed lateral flanges 12 of the base sections of the trunking 10. Here the lug 127 also includes an actuator tongue 130 connected to the free end 127A of said lug 127 and extending parallel to the inside face of the body 121 of the fishplate 100. The actuator tongue 130 is longer than the body 121 of the fishplate 100 and it therefore extends beyond said body and the free end of the actuator tongue 130 is accessible from outside the base sections of the juxtaposed lengths of trunking 10 when said fishplate is mounted in said base sections at the junction thereof.

The actuator tongue 130 is also used to withdraw the free end 127A of the lug 127 from the corresponding housing. To this end it is adapted to be pulled in its generally longitudinal orientation direction to withdraw the free end 127A of said lug 127 from its bearing engagement against the longitudinal rib 15 formed by abutting the two longitudinal ribs 15 of the juxtaposed lateral flanges 12.

The actuator tongue 130 has holding means of the same kind as those described for the actuator tongue 30. Here the holding means include an opening 131 for inserting the tip of a tool.

Of course, other holding means can also be provided, such as ribs that can be depressed by the tip of a tool or a rim that can be gripped manually.

The lug 127 is fitted into the housing in the juxtaposed lateral flanges 12 of the base sections of the trunking 10 in exactly the same way as the lug 27 on the retaining clip 20 is inserted into the corresponding housing in the longitudinal wall of the trunking base section, and the corresponding passages of the description should be referred to for more details of this.

To withdraw the fishplate 100 from its housing, it is sufficient to insert the tip of a tool into the opening 131 provided at the free end of the actuator tongue 130 and to use the rim 122 at the free end of the body 121 of the clip 100 as a fulcrum to use the tool as a lever to pull the actuator tongue 130 in its longitudinal direction to withdraw the free end 127A of the lug 127 from its bearing engagement against the corresponding longitudinal rib 15.

When the fishplate 100 is fitted at the junction of the base sections of the juxtaposed lengths of trunking 10, the lug 127 straddles the juxtaposed two lateral flanges 12 and connects them mechanically together.

Of course, the retaining clip 20, the joint support 50 and the fishplate 100 are each made in one piece, advantageously by molding them from a plastics material, and each lug 27, 57, 127 is formed in one piece with the corresponding accessory 20, 50, 100.

The present invention is in no way limited to the embodiments described and shown, many variants of which conforming to the spirit of the invention will be evident to the person skilled in the art.

What is claimed is:

1. An accessory for trunking including a base section, a body provided, at one or both of its ends, with attachment means for attaching the accessory locally to a longitudinal wall of the base section of said trunking, the longitudinal wall being an internal partition or a lateral flange of said base section, wherein said attachment means include a lug adapted to be clipped into a housing in said wall and including an actuator tongue connected to a free end of said lug, said actuator tongue being accessible from outside said base section of the trunking and adapted to be pulled in its longitudinal orientation direction to withdraw from said housing said free end of said lug, wherein said lug is connected to said end of said accessory by a flexible connection, wherein said flexible connection is a connection forming a pivot hinge of said lug, and wherein said flexible connection forms a boss adapted to bear against an inside face of said housing in said wall to clip said lug into said housing and immobilize it there.

2. An accessory for trunking including a base section, a body provided, at one or both of its ends, with attachment means for attaching the accessory locally to a longitudinal wall of the base section of said trunking, the longitudinal wall being an internal partition or a lateral flange of said base section, wherein said attachment means include a lug adapted to be clipped into a housing in said wall and including an actuator tongue connected to a free end of said lug, said actuator tongue being accessible from outside said base section of the trunking and adapted to be pulled in its longitudinal orientation direction to withdraw from said housing said free end of said lug, and further including an opening in said lug and in a portion of said body near said lug, through which said actuator tongue is accessible.

3. An accessory for trunking including a base section, a body provided, at one or both of its ends, with attachment means for attaching the accessory locally to a longitudinal wall of the base section of said trunking, the longitudinal wall being an internal partition or a lateral flange of said base section, wherein said attachment means include a lug adapted to be clipped into a housing in said wall and including an actuator tongue connected to a free end of said lug, said actuator tongue being accessible from outside said base section of the trunking and adapted to be pulled in its longitudinal orientation direction to withdraw from said housing said free end of said lug, wherein said actuator tongue includes holding means.

4. The accessory claimed in claim 3, wherein said holding means include at least one opening for inserting the tip of a tool.

5. The accessory claimed in claim 3, wherein said holding means include a rib which can be depressed with the tip of a tool.

6. The accessory claimed in claim 3, wherein said holding means include a rim which can be gripped manually.

7. An accessory for trunking including a base section, a body provided, at one or both of its ends, with attachment means for attaching the accessory locally to a longitudinal wall of the base section of said trunking, the longitudinal wall being an internal partition or a lateral flange of said base section, wherein said attachment means include a lug adapted to be clipped into a housing in said wall and including an actuator tongue connected to a free end of said lug, said actuator tongue being accessible from outside said base section of the trunking and adapted to be pulled in its longitudinal orientation direction to withdraw from said housing said free end of said lug, and wherein said lug has on each of its lateral sides a rim which can be depressed with a finger to clip said lug in said housing in said wall.

8. The accessory claimed in claim 1, wherein, in a rest position, said lug is oblique to said body and said actuator tongue is substantially parallel to said body and at an acute angle to said lug.

9. The accessory claimed in claim 1, wherein said lug is in one piece with said accessory.

10. The accessory claimed in claim 1, wherein said body is globally transverse to the longitudinal axis of said base section of said trunking.

11. An accessory for trunking including a base section, a body provided at one or both of its ends, with attachment means for attaching the accessory locally to a first longitudinal wall of the base section of said trunking, the longitudinal wall being an internal partition or a lateral flange of said base section, wherein said attachment means include a lug adapted to be clipped into a housing in said wall and including an actuator tongue connected to a free end of said lug, said actuator tongue being accessible from outside said base section of the trunking and adapted to be pulled in its longitudinal orientation direction to withdraw from said housing said free end of said lug, wherein said body is globally transverse to the longitudinal axis of the base section of the trunking, and wherein said body extends between the first longitudinal wall and a second longitudinal wall of said base section of said trunking and has at its other end a tab adapted to engage behind a rim of one of said two longitudinal walls.

12. The accessory claimed in claim 11, wherein said body extends between two said longitudinal walls of said base section of said trunking and has at its other end said lug with its actuator tongue.

13. A combination including a base section of trunking and an accessory, the base section having a longitudinal wall, the longitudinal wall being an internal partition or a lateral flange of said base section, the accessory being provided, at one or both of its ends, with attachment means for attaching the accessory locally to the longitudinal wall of the base section of said trunking, wherein said attachment means include a lug adapted to be clipped into a housing in said wall and including an actuator tongue connected to a free end of said lug, said actuator tongue being accessible from outside said base section of the trunking and adapted to be pulled in its longitudinal orientation direction to withdraw from said housing said free end of said lug, the accessory being adapted to be attached locally to a longitudinal wall of said base section, said housing being defined between a longitudinal rib on an inside face of said wall and a perpendicular inside surface of a perpendicular rim of said wall.

14. The combination as claimed in claim 13, wherein said lug is connected to said free end of said accessory by a flexible connection.

15. The combination as claimed in claim 14, wherein said flexible connection defines a pivot hinge.

16. The combination as claimed in claim 13, body including a boss adapted to bear against an inside face of said housing in said wall when said lug is clipped into said housing to immobilize it there.

17. The combination as claimed in claim 13, wherein said body is globally transverse to the longitudinal axis of said base section of said trunking.

* * * * *